United States Patent [19]

Powell et al.

[11] 4,025,581

[45] May 24, 1977

[54] BARRIER RESINS AND IMPACT MODIFIERS THEREFOR

[75] Inventors: John A. Powell, Willingboro, N.J.; Alan Williams, Richboro, Pa.

[73] Assignee: Rohm and Haas Company, Philadelphia, Pa.

[22] Filed: Sept. 9, 1975

[21] Appl. No.: 611,749

Related U.S. Application Data

[62] Division of Ser. No. 248,147, April 27, 1972, Pat. No. 3,939,223.

[52] U.S. Cl. .................. 260/880 R; 260/29.7 UA; 260/45.95 R; 260/876 R; 426/106; 526/293; 526/329; 526/342; 526/347

[51] Int. Cl.$^2$ .................. C08L 51/00; C08L 53/00

[58] Field of Search ......... 260/876 R, 880 R, 80.81

[56] References Cited

UNITED STATES PATENTS

| | | | |
|---|---|---|---|
| 3,449,471 | 6/1967 | Weitzel et al. | 260/876 R |
| 3,451,538 | 6/1969 | Trementozzi | 260/876 R |
| 3,463,833 | 8/1969 | Isogawa et al. | 260/876 R |
| 3,524,536 | 8/1970 | Terenzi et al. | 260/876 R |
| 3,555,119 | 1/1971 | Ingulli et al. | 260/876 R |
| 3,615,710 | 10/1971 | Lee et al. | 260/876 R |
| 3,720,339 | 3/1973 | Khetahi | 260/876 R |
| 3,939,223 | 2/1976 | Powell et al. | 260/876 R |

Primary Examiner—Richard B. Turer
Attorney, Agent, or Firm—Michael B. Fein

[57] ABSTRACT

Polymers having low permeability to gases and vapors and yet high heat stability and creep resistance are prepared by a novel method of polymerizing acrylonitrile, a vinylidene aromatic monomer such as styrene and an olefinic ester such as methyl methacrylate. Conjugated diene-based impact modifiers for said polymers are disclosed, as well as impact-resistant blends of said polymers and said impact modifiers. The blends are useful for packaging materials in applications wherein high thermoformability and processability, as well as excellent barrier properties and heat stability, color stability, and creep resistance are desired.

3 Claims, No Drawings

BARRIER RESINS AND IMPACT MODIFIERS THEREFOR

This is a division, of application Ser. No. 248,147 filed Apr. 27, 1972 now U.S. Pat. No. 3,939,223.

DESCRIPTION OF THE INVENTION

This invention relates to novel barrier resin compositions, impact modifiers therefor, and impact-modified blends suitable for packaging materials, and to novel methods for preparing such types of compositions. More particularly, it relates to novel gas barrier resin compositions having improved heat stability, color characteristics, and creep resistance.

Many synthetic polymers have been suggested for use as packaging materials for foods, medicines, and other substances such as carbonated beverages. There are disadvantages to each of the previously suggested compositions which limit their usefulness for this purpose. Several of those materials have insufficient barrier properties, i.e, resistance to oxygen, carbon dioxide, and water vapor transmission. Others have insufficient color stability which makes them undesirable as packaging materials from an aesthetic viewpoint. Further problems with prior art acrylonitrile-based compositions are poor service temperature and resistance to creep for applications requiring hot-fill or packaging carbonated beverages.

Acrylontrile-based barrier resins have also had the disadvantage of poor color stability, and methacrylonitrile has been suggested as a substitute monomer by Trementozzi et al, U.S. Pat. No. 3,540,577 of Nov. 17, 1970, and Nemphos et al, Netherlands application 7014959 to solve this coloration problem with acrylonitrile-based polymers.

Although methacrylonitrile does partially alleviate the coloration problem, it too suffers from disadvantages such as low reaction rate, less nitrile density (the nitrile moiety is responsible for barrier properties) and relatively high price, making methacrylonitrile-based barrier resin compositions less advantageous than acrylontrile-based compositions.

Prior art barrier resins have impact modifier or elastomer grafted with the barrier composition, e.g., the barrier is polymerized in the presence of the preformed elastomeric substrate. This approach limits the final solids level and causes difficulties in achieving high conversions of starting monomers to polymer.

It is, therefore, an object of this invention to provide a novel barrier resin composition based upon acrylonitrile for use in packaging applications where high heat stability color and clarity retention, processability (thermoformability), and improved creep resistance are desired.

It is a further object to provide novel impact modifiers for said barrier resin compositions which are matched in refractive index, and are especially compatible and dispersible with the barrier resin compositions while not detracting significantly from barrier properties.

It is a still further object to provide blends of said resin compositions and impact modifiers which may be readily formed into packaging materials having the aforementioned desirable properties.

Another object is to provide a novel process for producing polymers which results in highly uniform polymeric compositions having improved properties due to the novel process.

A further object is to provide a process facilitating the use of acrylonitrile as the major component and vinylidene aromatic monomer as a minor component of the composition while achieving exceptional color and clarity retention and processability.

The above and other objects are achieved by providing barrier resin compositions having from about 50 to 90 weight percent acrylonitrile, from about 5 to about 28 weight percent of a vinylidene aromatic monomer, and from about 2 to 25 weight percent of an olefinic ester monomer.

Impact modifier compositions are also provided which are highly suitable for blending with barrier resin compositions and comprise a graft copolymer having an acrylonitrile-vinylidene aromatic monomer-olefinic ester superstrate and a conjugated diene-based substrate, said superstrate being over 50 percent grafted, i.e., chemically attached, to the substrate.

When it is desired to prepare the impact modifiers having the superstrate over 50% grafted over elastomeric substrate, said polymerization is conducted in the presence of an elastomer latex, such as a butadiene or isoprene-based polymer.

A novel process for preparation of polymers such as the aforementioned barrier resin compositions and impact modifying compositions for improved toughness, uniformity, color and clarity as compared with conventional processes for preparation of said compositions is provided and comprises first introducing into an aqueous medium a major amount of acrylonitrile, and minor amounts of vinylidene monomer, olefinic ester monomer, emulsifier, and free radical polymerization initiator so as to produce an initial polymer of the desired mer ratio, and thereafter continuously introducing acrylonitrile, vinylidene aromatic monomer and olefinic ester monomer at said desired mer ratio at the exact rate at which polymer is being formed until the desired solids level in the emulsion is reached, and then immediately terminating further polymerization, for example, by introducing a chain-stopping agent.

The Barrier Resin

The barrier resin composition comprises a polymer of from about 50 to 90, preferably 65 to 80, and most preferably 72 to 76 weight percent acrylonitrile, from about 5 to 28, preferably 15 to 25, weight percent of a vinylidene aromatic monomer and from about 2 to 25, preferably 2 to 10, weight percent of an olefinic ester monomer.

Suitable vinylidene aromatic monomers are styrene, α-methylstyrene, halogen-substituted styrenes such as chlorostyrenes, alkyl ring-substituted styrenes each as vinyl toluene or tert-butylstyrene and other substituted styrenes such as p-cyanostyrene, p-carbomethoxystyrene, o-nitrostyrene, etc.

The preferred vinylidene aromatic monomers are styrene and α-methylstyrene.

Suitable olefinic esters are alkyl acrylates such as methyl acrylate, ethyl acrylate, butyl acrylate, isobutyl acrylate, 2-ethylhexyl acrylate; alkyl alkacrylates, such as methyl methyacrylate, ethyl methacrylate, 2-ethylhexyl methacrylate, etc. Also suitable are the haolgen-substituted acrylates such as 2-chloromethyl acrylate and cyano-substituted acrylates such as 2-cyanomethyl and 2-cyanoethyl acrylates. Methyl methacrylate is the most preferred olefinic ester monomer. Isobutylene has been found to be an unsuitable substitute for the olefinic ester component of the barrier resin since it has a deleterious effect on color and service temperature.

A most preferred composition comprises 72 to 76 weight percent acrylonitrile, 19 to 21 weight percent styrene and 4 to 6 weight percent methyl methacrylate. The barrier resin composition, without added impact modifier, preferably has a Vicat temperature of at least 90° C. as measured by ASTM method D 1525, and an intrinsic viscosity measured in dimethyl formamide of 0.60 to 0.84 deciliters per gram.

The Impact Modifiers

The impact modifier is a graft of a superstrate interpolymer onto a substrate polymer.

The supersrate must be at least 50 percent chemically attached to the substrate for highest combined impact strength and barrier properties, as determined by conventional tests such as extraction with N,N-dimethylformamide or acetonitrile.

The substrate is a cross-linked latex having a glass transition temperature of less than −40° C. as determined by ASTM Test D 746-52T, and comprises about 50 to 100 weight percent of a conjugated diene selected from the group consisting of isoprene and 1,3-butadiene, chloroprene, bromoprene, cyanoprene, 2,3-dimethyl-butadiene-1,3; 2-ethyl-butadiene-1,3; 2,3-diethyl-butadiene-1,3 and mixtures thereof, with isoprene and 1,3,-butadiene preferred, with the remainder derived from an ethylenically unsaturated monomer selected from the group consisting of vinylidene aromatic monomers, acrylonitrile, and an olefinic ester monomer.

The ethylenically unsaturated monomer can be vinylidiene aromatic monomers such as styrene, α-methyl styrene, 2,4-dimethylstyrene, tert-butylstyrene, vinylnaphthalene, chlorostyrene, 2,4-dibromostyrene, etc., and mixtures thereof.

The olefinic ester monomer for the substrate polymer is of the formula

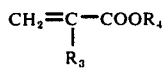

wherein $R_3$ is hydrogen, halogen, or an alkyl group of from 1 to 6 carbon atoms and wherein $R_4$ is an alkyl group of from 1 to 8 carbon atoms. Exemplary are alkyl acrylates such as methyl acrylate, ethyl acrylte, propyl acrylate, isopropyl acrylate, butyl acrylate, isobutyl acrylate, 2-ethylhexyl acrylate, alkyl alkacrylates such as methyl methacrylate, ethyl methacrylate, ethyl ethacrylate, propyl methacrylte, isopropyl methacrylate, n-butyl methacrylate, isobutyl methacrylate, 2-cyanoethyl methacrylate, 2-chloroethyl methacrylate, etc. and mixtures thereof.

A preferred group of substrates are those consisting essentially of from 65 to 100 weight percent 1,3-butadiene or isoprene, up to 35 weight percent styrene, and less than 10 weight percent methyl methacrylate. Most preferred is a 70 to 80 weight percent butadiene, 20 to 30 weight percent styrene and 3 to 5 weight percent methyl methacrylate polymer. Methods for preparing these substrates are well known and conventional. See, for example, U.S. Pat. No. 3,536,786.

The superstrate polymer is a polymer of from 50 to 90 weight percent acrylonitrile, from 5 to 28 weight percent of a vinylidene aromatic monomer and from 2 to 25 weight percent of an olefinic ester monomer. The vinylidene aromatic monomer can be styrene, α-methylstyrene, vinylnaphthalene, chlorostyrene, 2,4-dibromostyrene, etc. The olefinic ester is preferably methyl acrylate, but others such as those olefinic esters used in the substrate can be used.

The preferred superstrate composition is comprised of about 65 to 75 weight percent acrylonitrile, about 11 to 14 weight percent styrene, and about 17 to 19 weight percent methyl acrylate.

The polymerization of the superstrate is carried out to the desired ratio of superstrate to substrate, i.e., about 20 to 60 weight percent, preferably 35 to 45 weight percent superstrate, and 80 to 40 weight percent, preferably 65 to 55 weight percent substrate.

By proper adjustment of the monomer ratios in both the superstrate and the substrate of the impact modifier, the refractive index can be adjusted so that it exactly matches that of the barrier composition for maximum clarity of the blends.

The Blends

Blends are provided having a superior balance of properties as compared with previous impact-modified barrier resin compositions about 60 to 80 weight percent, preferably 70 to 80 weight percent, of the barrier resin composition of this invention, and about 40 to 20 weight percent, preferably 30 to 20 weight percent of the impact modifier composition. Alternatively, said barrier resin composition can be used without added impact modifier in applications such as films. The impact modifier compositions are useful with other barrier resin compositions than those of this invention.

The blends of the invention are highly suitable for making packaging materials such as bottles for carbonated beverages due to their outstanding gas and vapor barrier properties, rigidity, clarity, chemical resistance, thermoformability, colorability, impact strength, and low creep. These blends can contact optional components such as inert fillers, other polymers, stabilizers, plasticizers, pigments, etc.

It is preferred that the two components of the blend, i.e., the barrier resin and the impact modifier, have the same refractive index so as to maximize clarity.

The Novel Process

While various methods can be employed for the preparation of the barrier resin composition, for example conventional bulk, suspension, or solution polymerizations, we have found it highly preferably when a composition of increased toughness, uniformity and improved color and clarity is desired, to employ a novel process which we have developed for preparation of these polymers and the impact modifier superstrates. This process comprises first introducing into an aqueous medium amounts of acrylonitrile, vinylidene aromatic monomer, olefinic ester monomer, emulsifier and free radical polymerization initiator so as to produce an initial or "instant" terpolymer of the desired mer ratio, and thereafter immediately begin continuously introducing acrylonitrile, vinylidene aromatic and olefinic ester at said desired mer ratio at the exact rate at which polymer is being formed until the desired solids level in the emulsion is reached, and then immediately terminating further polymerization such as by introducing a chain stopping agent. Unreacted monomers can be removed by conventional methods and recycled. It will be appreciated by those skilled in the art that the initial amounts of monomers are not necessarily at the same ratio as desired for the initial terpolymer ratio due to the differences in reactivity of the 3 monomers. Therefore, the initial amounts introduced must be determined as a function of the relative reactivities under the reaction conditions used, the desired ratio of 1 monomer to the other for the final terpolymer, and the rate of polymerization desired.

After initiating the reaction with amounts of monomers determined by the above consideration, the three monomers are introduced into the reaction vessel continuously at the desired mer ratio corresponding to the ratio desired in the final product at a controlled rate. For maximum uniformity, the rate of introduction of additional monomer is to be as close as possible to the rate at which polymer is being formed. This step can be achieved, for example, by controlling the rate of introduction as a function of the reaction temperature, the unreacted monomer concentration in the vessel, emulsifier, initiator and chain transfer agent. Once the rate of polymer formation is determined, the rate of monomer addition can be maintained at a constant rate for the entire polymerization. Preferably, the parameters are adjusted to attain a rate of reaction consistent with heat removal capability of the reactor.

This process allows the preparation of high solids emulsions in large reactors under controlled conditions. Previously suggested methods required the gradual addition of the more reactive monomer to a reactor containing all of the less reactive monomer or monomers. However this system required rapid removal of heat of polymerization and therefore is only satisfactory for small reactors. The present invention facilitates the preparation of a highly uniform polymer in large reactors and to very high final solids content, e.g., 40 to 50%, as compared with the 25 to 30% levels previously achieved.

The emulsifier used depends upon whether or not it is to remain in the finished product. If the emulsions are to be isolated by precipitation and washing, a hydrophilic emulsifier can be used. However if the emulsion is to be spray dried, the emulsifier remains in the finished product and it is important to select a hydrophobic emulsifier. A further criterion in selecting an emulsifier is that it must have good color stability at the elevated temperature to which the resin is subjected during processing and which does not induce color formation in the resin. Suitable hydrophobic emulsifiers are potassium dodecylbenzene sulfonate, alkyl sulfonates, sodium dioctyl sulfosuccinate, and alkyl phosphoric acid salts such as mixtures of phosphoric esters. The emulsifier is preferably present in amounts of from 0.5 to 2 weight percent based on weight of final polymer.

The polymerizatin initiators are those which are known in the art. Suitable initiators are water soluble peroxy catalysts such as alkali metal peroxides; the alkali metal and ammonium persulfates, perborates, peracetates and hydrogen peroxide. Monomer-soluble peroxy and perazo compounds such as di-tert-butyl peroxide, di-benzoyl peroxide, di-lauroyl peroxide, di-oleyl peroxide, di-toluyl peroxide, di-tert-butyl diperphthalate, tert-butyl peracetate, tert-butyl perbenzoate, dicumyl peroxide, 2,5-dimethyl-2,5-di(tert-butylperoxy) hexane, 2,5-dimethyl2,5-di(tert-butyl-peroxy) hexyne-3, tert-butyl hydroperoxide, cumene hydroperoxide, p-menthane hydroperoxide, cyclopentane hydroperoxide, diisopropylbenzene hydroperoxide, p-tert-butyl-cumene hydroperoxide, pinane hydroperoxide, 2,5-dimethylhexane-2,5-dihydroperoxide, etc.; azo-diisobutyronitrile and mixtures thereof are suitable.

The initiator is generally included within the range of 0.001 to 2.0 percent by weight and preferably about 0.005 to 1.0 percent by weight of the polymerizable material. Common redox pairs can be employed as the catalysts. Suitable reducing agents for the redox pairs are alkali metal and ammonium sulfites, hydrosulfites, metabisulfites, thiosulfates, sulfinates, formaldehydesulfoxylates or ascorbic acid, dihydroxyacetone, dextrose, etc. Various other reducing agents for redox systems can also be employed.

The amount of reducing agent will be about 0.001 to 1.0 percent by weight, and preferably on the order of 0.005 to 0.5 percent by weight, of the polymerizable monomer formulation, depending on the catalyst and the amount thereof. For redox systems, minute amounts of activators or promotors such as ferrous salts, cobalt and copper salts may be included.

The proper choice and amount of chain transfer agent is necessary for careful molecular weight control. Suitable chain transfer agents include alkyl and cycloalkyl mono and polymercaptans, mercaptoethanol, thioglycolate esters, mercaptopropionates, etc. and mixtures thereof.

The preferred chain transfer agent is n-dodecyl mercaptan. Amounts of from 0.5 to 2 weight percent are suitable depending upon other variables.

Temperatures of 25° to 90° C. are suitable, and are selected depending upon the particular monomers, initiators, and other variables selected. The preferred temperature range is from about 60° to 80° C.

Rate of polymer formation can be conveniently controlled in the range of from 3 to 30 parts per hundred parts of water per hour; the highest rate consistent with reactor design is preferred.

The following examples are presented to illustrate but a few embodiments of this invention but are not intended to be limiting. All parts and percentages are given on a weight basis unless otherwise specified.

EXAMPLE 1

This example illustrates a barrier resin composition prepared by the process of the invention. Into a reaction flask equipped with a 150 rpm stirrer, thermometer, condenser, liquid feed port, nitrogen inlet and closure vent to the atmosphere, are introduced the following:

8,020 parts deionized water
90 parts of a 10% aqueous potassium dodecylbenzene sulfonate solution
577 parts acrylontrile
10.8 parts styrene
12.3 parts methyl methacrylate
7.2 parts n-dodecyl mercaptan The reaction mixture is stirred and heated while sparging with nitrogen for 45 minutes. When the temperature reaches 65° C., 0.8 part of potassium persulfate dissolved in 300 parts deionized water is added. A mixture of 4,950 parts acrylonitrile, 1,320 parts of styrene, 330 parts of methyl methacrylate, 78 parts n-dodecyl mercaptan is continuously added at a rate of 667.8 parts per hour simultaneously with the introduction of 66 parts per hour of 10% aqueous potassium dodecylbenzene sulfonate for 10 hours. The temperature of the raction mixture is controlled at 65° C. for the period of addition of the monomer mixture. As a chain-stopping agent, 12 parts of 2,5-di-tert-butyl paracresol are added to the emulsion. The polymer is thereafter coagulated by pouring the dispersion into two volumes of 2% aqueous calcium chloride solution at a temperature of 70°–75° C. The product is filtered and washed with deionized water and thereafter dried in vacuum from 55°–65° C. to a moisture content off 0.2%.

The uniformity of mer ratio in polymer formed under these conditions is shown by analyses of samples isolated from a similar reaction mixture at time intervals of 1 hour and 6 hours after commencement of polymerization.

| Time from Initiation, hrs. | Nitrogen, % |
|---|---|
| 1.0 | 19.83 |
| 6.0 | 19.48 |

The resultant resin has very good processing characteristics, almost no elastic memory of "nerve" during processing, good melt flow properties, almost no color after heating for 5 minutes at 350° F., and good clarity of press slab. Molded samples exhibit outstanding resistance to tensile creep at 2,000 psi under ambient conditions and submerged in water and have a Deflection Temperatures Under Load (264 psi) of 85° C. (ASTM D648-56).

EXAMPLE 2

This example illustrates the preparation of a uniform polymer by a non-conventional batch process, but one which is related to those disclosed in the prior art.

Into equipment similar to that described for Example 1, is placed the following:
11,100 parts of deionized water
1,000 parts of a 10% aqueous potassium dodecylbenzene sulfonate solution
3,747 parts of acrylonitrile
69.5 parts of styrene
80.5 parts of methyl methacrylate
77.9 parts of n-dodecyl mercaptan The reaction mixture is stirred and heated to 65° while sparging with nitrogen for 45 minutes. Thereupon is added 5 parts of potassium persulfate dissolved in 500 parts of nitrogen sparged water which initiates polymerization of the monomer mixture in the reactor. The following mixture of monomers is added to the reactor according to the schedule then described:
899 parts of styrene
204 parts of methyl methacrylate
22 parts of n-dodecyl mercaptan The composition of the initial charge mixture of monomers is such that polymer initially formed has the approximate mer ratio 75 parts of acrylonitrile, 20 parts of styrene and 5 parts of methyl methacrylate and the rate at which the addition charge is added to the reactor is that which is required to cause continuing formation of polymer having approximately the same mer ratio. A uniformity of mer ratio in the polymer results when the mixture of unreacted monomers in the reactor is maintained at a constant ratio. This is shown in the tabulation of monomer compositions above which were determined by GLC analyses of each sample.

The polymer prepared by this process has color and clarity slightly inferior to that of the polymer described in Example 1. However, it exhibits absence of "nerve," which is a distinguishing charadcteristic of uniform composition polymers.

However, this process is unsuitable for the practical synthesis of large quantities of similar polymer because in order to control the heat of polymerization either excessive dilution with water is required or application of refrigerating devices is required such that in either case the entire process is rendered impractical.

EXAMPLE 3

This example illustrates the preparation of a polymer by a conventional batch process with gradual addition of monomers.

Into equipment similar to that described for Example 1 is placed 1112 parts of deionized water, which is stirred and heated to 65° C while bubbling nitrogen beneath the surface for 45 minutes. Thereafter is added to the reactor 7.5 parts of 10% aqueous potassium dodecyl benzene sulfonate solution and 0.5 part of potassium persulfate dissolved in 20 parts of deionized water, the latter having been sparged with nitrogen at room temperature for 45 minutes. While the temperature of the reaction mixture is held at 65° by application of external heat or cooling as needed, addition of a mixture of 350 parts of acrylonitrile, 100 parts of styrene, 50 parts of methyl methacrylate and 10 parts of n-dodecyl mercaptan is conducted at a uniform rate of 125 parts per hour, which corresponds to the rate at which polymer is formed.

Beginning 30 minutes after commencement of the addition of the foregoing mixture, concurrent addition of a 10% aqueous solution of potassium dodecyl benzene sulfonte is conducted at a uniform rate finishing together with the addition of the monomer mixture.

The addition of the monomer mixture may be found to require 4 hours, at which time the conversion of monomer to polymer is 89.6% of theoretical. The poly-

| Time (Min) | Monomer Mix Parts Added | % Solids | Total Mixture Charged Parts by Wt. | Solids Parts by Wt. | Polymer Parts by Wt. | Composition of Unpolymerized Monomers | | |
|---|---|---|---|---|---|---|---|---|
| | | | | | | AN | S | MMA |
| 0 | | | | | | 94 | 4.0 | 2.0 |
| 15 | 171 | 6.8 | 16251 | 1105 | 1000 | 96.4 | 2.0 | 1.5 |
| 30 | 342 | 12.0 | 16422 | 1971 | 1866 | 96.2 | 2.6 | 1.2 |
| 45 | 513 | 15.9 | 16593 | 2638 | 2533 | 94.8 | 3.9 | 1.4 |
| 60 | 684 | 18.9 | 16764 | 3168 | 3063 | 93 | 5.4 | 1.7 |
| 90 | 882 | 23.3 | 16962 | 3952 | 3847 | 94.7 | 3.9 | 1.4 |
| 125 | 992 | 26.2 | 17072 | 4473 | 4368 | 93.3 | 5.6 | 1.1 |
| 165 | 1069 | 27.9 | 17149 | 4785 | 4680 | 86.7 | 11.6 | 1.6 |
| 205 | 1125 | 28.6 | 17205 | 4921 | 4816 | 89.4 | 9.4 | 1.2 |
| 265 | 1125 | 29.2 | 17205 | 5024 | 4919 | — | — | — | mer is isolated by the procedure described in Example 1.

This polymer has a composition which varies with time, as shown in the following table:

| Time, hrs. | C, % | H, % | N, % | O, % |
|---|---|---|---|---|
| 1.0 | 75.0 | 7.07 | 12.21 | 5.72 |
| 4.0 | 72.8 | 6.49 | 17.66 | 3.08 |

The resultant resin, compared with that made by the process described in Example 1, is yellow colored, hazy, and is more difficult to impact modify.

EXAMPLE 4

This example illustrates the preparation of an impact modifier composition in accordance with the invention. To 7,431 parts of an elastomer latex (43.6% solids) having a composition of 75 parts 1,3-butadiene, 26 parts styrene and 4 parts methyl methacrylate are added 6,299 parts deionized water and 1,095 parts of a 10% solution of sodium lauryl sulfate. The mixture is stirred and heated for 90 minutes while sparging with nitrogen until a temperature of 65° C. is reached, then a mixture of 766 parts of acrylonitrile, 12.8 parts styrene, 126 parts methyl methacrylate, 3.4 parts n-dodecyl mercaptan is added followed in one minute by 2.16 parts potassium persulfate dissolved in 105 parts deionized water. Immediately the addition of a mixture of 1,680 parts acrylonitrile, 295 parts styrene, 425 parts methyl methacrylate and 24.0 parts n-dodecyl mercaptan is begun at a rate of 894 parts per hour. The temperature is maintained at 64°–66° C. until a total of 2,160 parts is added. Immediately thereafter, 64.8 parts of 2,6-di-tert-butyl-p-cresol is added to the dispersion which is simultaneously cooled to below 50° C. The dispersion is filtered.

EXAMPLE 5

This example is similar to Example 4 except that the polymerization of the superstrate monomers is effected by a conventional batch process with a portion of the monomers added to the substrate initially and the remainder added gradually.

Into equipment similar to that described in Example 4 is charged the following ingredients:

| | parts by weight |
|---|---|
| Deionized water | 1521 |
| Elastomer latex (42.9% solids) | 1678 |
| Potassium dodecylbenzene sulfonate, 10% aqueous solution | 216 |
| Acrylonitrile | 117.7 |
| Styrene | 22.2 |
| Methyl Acrylate | 28.2 |
| n-Dodecyl mercaptan | 1.7 |
| Potassium persulfate, 0.5% aqueous solution | 100 |

The mixture is stirred, sparged with nitrogen, and heated to 65° C. When this this temperature is reached, the addition of a mixture of the following ingredients is begun:

| | |
|---|---|
| Acrylonitrile | 208.3 |
| Styrene | 41.2 |
| Methyl Acrylate | 52.4 |
| n-Dodecyl Mercaptan | 3.1 |

The above mixture is added over a 50 minute period while cooling or heating as needed to maintain the temperature at 65° C. The reaction mixture is held at 65° C. for 1 hour after completion of the addition, at which time the product is isolated by coagulation as in Example 4.

EXAMPLE 6

This example is similar to Example 5, except that all of the monomers are mixed with the elastomer latex prior to polymerization. This is the simplest form of batch polymerization of the superstrate monomers in the presence of the substrate latex.

Into equipment similar to Example 4 is charged the following:

| | parts by weight |
|---|---|
| Deionized water | 2386 |
| Elastomer latex (42.9% solids) 1119 | |
| Potassium dodexylbenzene sulfonate, 10% aqueous | 71 |
| Acrylonitrile | 224 |
| Styrene | 42.3 |
| Methyl Acrylate | 53.7 |
| n-Dodecyl mercaptan | 3.2 |

The mixture is stirred and heated to 65° C. while bubbling nitrogen beneath the surface for 60 minutes. A solution of potassium persulfate, 0.50 gram dissolved in 100 grams of deionized water, is added when the temperature reaches 56° C. The temperature is allowed to rise to 65° C. where it is maintained for 135 minutes. The mixture is then cooled and isolated by coagulation as in Example 4.

EXAMPLE 7

This example is similar to Example 4 except that the ratio of substrate to superstrate is 50/50.

Into equipment similar to that described for Example 1, is charged the following ingredients:

| | parts by weight |
|---|---|
| DI Water | 1425 |
| Sodium dioctylsulfosuccinate | 3 |
| Elastomer latex (43.2% solids) | 465 |

The mixture is stirred and heated to 65° C. while bubbling nitrogen beneath the surface for 45 minutes. Next there is added to the reactor a mixture of

| | |
|---|---|
| Acrylonitrile | 21.3 |
| Styrene | 0.35 |
| Methyl Acrylate | 2.8 | followed by a solution of 2 parts by weight of potassium persulfate dissolved in 55 parts of degassed water. Uniform rate addition of 3.9 parts per minute of the following mixture is begun at once to ensure containing polymerization of the same composition polymer as is formed initially.

| | |
|---|---|
| Acrylonitrile | 118.1 |
| Styrene | 25.3 |
| Methyl Acrylate | 25.3 |

The step is completed in 43 minutes at which time a charge of 4.8 parts of styrene with 2.1 parts of methyl acrylate is added to the reactor to ensure that polymerization of monomers then unreacted will be completed with formation of polymer having the same mer ratio as the foregoing. Polymerization is stopped by cooling after another 62 minutes and the polymer is isolated in the usual way by coagulation in 1.5 volumes of 1% CaCl$_2$ solution at 65°.

Correspondence of the rate of polymerization with the rate of addition of monomer mixture is shown by measuring the progress of polymerization at the indicated intervals:

| (Min.) Time | % Solids | Parts by Weight | |
|---|---|---|---|
| | | Polymer Formed | Monomer Added |
| 15' | 14.1 | 39 | 60 |
| 30' | 17.7 | 111 | 118 |
| 43' | 20.0 | 162 | 169 |
| 58' | 21.3 | 187 | 200 |
| final | 21.7 | 194 | 200 |

The final product contains 194 parts by weight (corrected for soap and initiator) of 2nd stage polymer together with 200 parts by weight of elastomer solids, which corresponds to a 50.8/49.2 stage ratio.

EXAMPLE 8

This example illustrates the preparation of an impact modifier with a superstrate to substrate ratio of 50/50 by a conventional batch process with gradual addition of monomers.

Into equipment similar to that described for Example 1, is charged the following ingredients:

| | parts by weight |
|---|---|
| DI Water | 2202 |
| 10% aqueous pot. dodecyl benzene sulfonate | 99 |
| elastomer latex (43.0% solids) | 1535 |
| potassium persulfate | 6.6 |

The mixture is stirred and heated to 65° while degassing for 45 minutes. Thereupon the following mixture was added at a uniform rate over a period of 4 hours 35 minutes.

| Acrylonitrile | 462 |
|---|---|
| Styrene | 99 |
| Methyl Acrylate | 99 |

Analysis of residual monomer throughout the polymerization indicates that the monomers are not incorporated in a uniform manner and that undesirable blocks of polyacrylonitrile are formed.

Heating is continued for 45 minutes. A mixture of 13.2 parts of 2,5-di-tert-butyl-p-cresol finely dispersed with 86.8 parts of water is added to prevent thermal darkening of the elastomer latex.

Measurement of the progress of polymerization showed that 615 parts by weight (corrected for soap, initiator and stabilizer) of 2nd stage polymer is present, affording an elastomer (solids) to 2nd stage polymer ratio of 51.8/48.2 parts by wt.

The product is isolated in the usual manner by coagulation in 1.5 volumes of 1% CaCl$_2$ solution at 65° after removing 1.5 parts by weight of undispersed material by filtration and is dried at 55° under vacuum to a moisture content of 0.3% by weight.

EXAMPLE 9

The dispersion of Example 4 is blended with the dispersion of Example 1 and then unreacted monomers are recovered by a stripping procedure which comprises raising the temperature to 100° C. until the residual monomer level in the dispersion is reduced to 0.05 weight percent acrylonitrile. The dispersion is then coagulated by mixing with 1.5 volumes of a 1.0% calcium chloride solution at 65°–75° C. The polymer is removed by filtration, washed, and dried to a waer content of below 0.2%.

The dried crumb or powder is milled on a tworoll mill for 5 minutes at 350° F. and then heated for 2 minutes in a Carver press at 350° F., pressed for 3 minutes at 350° F. at 18,000 psi and then cooled for 4 minutes under pressure. Test pieces are cut and have Izod impact strength measurement of 1.5 ft. lbs./inch-notch, and have excellent clarity and color. Films pressed at 350 F. from this blend have excellent gas barrier properties. Molded samples exhibit outstanding resistance to tensile creep at 2,000 psi under ambient conditions and submerged in water and have a Deflection Temperature Under Load (264 psi) of 83° C. (ASTM D-648-56).

EXAMPLE 10

The dispersion of example 7 is blended with the dispersion of example 1. Residual monomers are removed and the material isolated as in example 9. Milled and molded samples of this blend have better color stability and impact resistance, i.e., Izod values of 1.0 foot-pound per inch of notch, than the blend described in Example 11. Films pressed from the blend described in this example have excellent oxygen, carbon dioxide, and water barrier properties.

EXAMPLE 11

The dispersion of example 8 is blended with the dispersion of example 1. Residual monomers are removed and the material isolated as in example 9 and 10. Milled and molded samples of this blend have poor impact resistance, i.e., Izod values of 0.65 foot-pounds per inch of notch and are undesirably colored.

We claim:

1. An impact modifier composition comprising a graft copolymer of (A) from 20 to 60 weight percent of a superstrate polymer polymerized from a monomer mixture comprising from 50 to 90 weight percent acrylonitrile, from 5 to 28 weight percent of vinylidene aromatic monomer of the formula

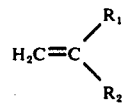

wherein R$_1$ is hydrogen, chlorine or methyl and R$_2$ is a substituted or unsubstituted aromatic radical having from 6 to 10 carbon atoms and from 2 to 25 weight percent of an olefinic ester of the formula

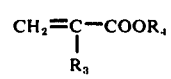

and (B) from 80 to 40 weight percent of a substrate polymer having a glass transition temperature of less than −40° C. comprising from 50 to 100 weight percent of a conjugated diene selected from the group consisting of 1,3-butadiene and isoprene, from 50 to 0 weight percent of an ethylenically unsaturated monomer selected from the group consisting of vinylidene aromatic monomer, acrylonitrile, and mixtures thereof, and from 0 to 10 weight percent of olefinic ester, provided that said superstrate polymer is at least about 50 percent grafted onto said substrate polymer.

2. The compositions of claim 1 wherein said superstrate constitutes from about 35 to 45 weight percent of the composition and is comprised of from about 65 to 75 weight percent acrylonitrile, from about 11 to 14 weight percent styrene and from about 17 to 19 weight percent methyl acrylate.

3. The composition of claim 1 wherein said substrate is comprised of from 70 to 80 weight percent 1,3-butadiene, from 20 to 30 weight percent styrene, and from 3 to 5 weight percent methyl methacrylate.

* * * * *